United States Patent [19]

Kingsley

[11] 4,180,737

[45] Dec. 25, 1979

[54] X-RAY DETECTOR

[75] Inventor: Jack D. Kingsley, Schenectady, N.Y.

[73] Assignee: General Electric Company, Schenectady, N.Y.

[21] Appl. No.: 875,146

[22] Filed: Feb. 6, 1978

[51] Int. Cl.² .............................................. G01T 1/20
[52] U.S. Cl. ................................. 250/367; 250/445 T; 250/505
[58] Field of Search ............ 250/363 R, 363 S, 445 T, 250/367, 505

[56] References Cited

U.S. PATENT DOCUMENTS

| 3,668,395 | 6/1972 | Walker | 250/363 S |
|---|---|---|---|
| 3,784,819 | 1/1974 | Martone et al. | 250/363 S |
| 3,866,047 | 2/1975 | Hounsfield | 250/445 T |

Primary Examiner—Davis L. Willis
Attorney, Agent, or Firm—Geoffrey H. Krauss; Joseph T. Cohen; Marvin Snyder

[57] ABSTRACT

A solid state x-ray detector has a scintillator element converting x-ray flux to fluorescence photons, a photosensor detecting the x-ray induced fluorescence of the scintillator, and collimator plates of a high atomic number material and having thickened end regions disposed toward the x-ray source to prevent the x-ray flux from impinging upon the edge region of a misaligned scintillator element.

15 Claims, 1 Drawing Figure

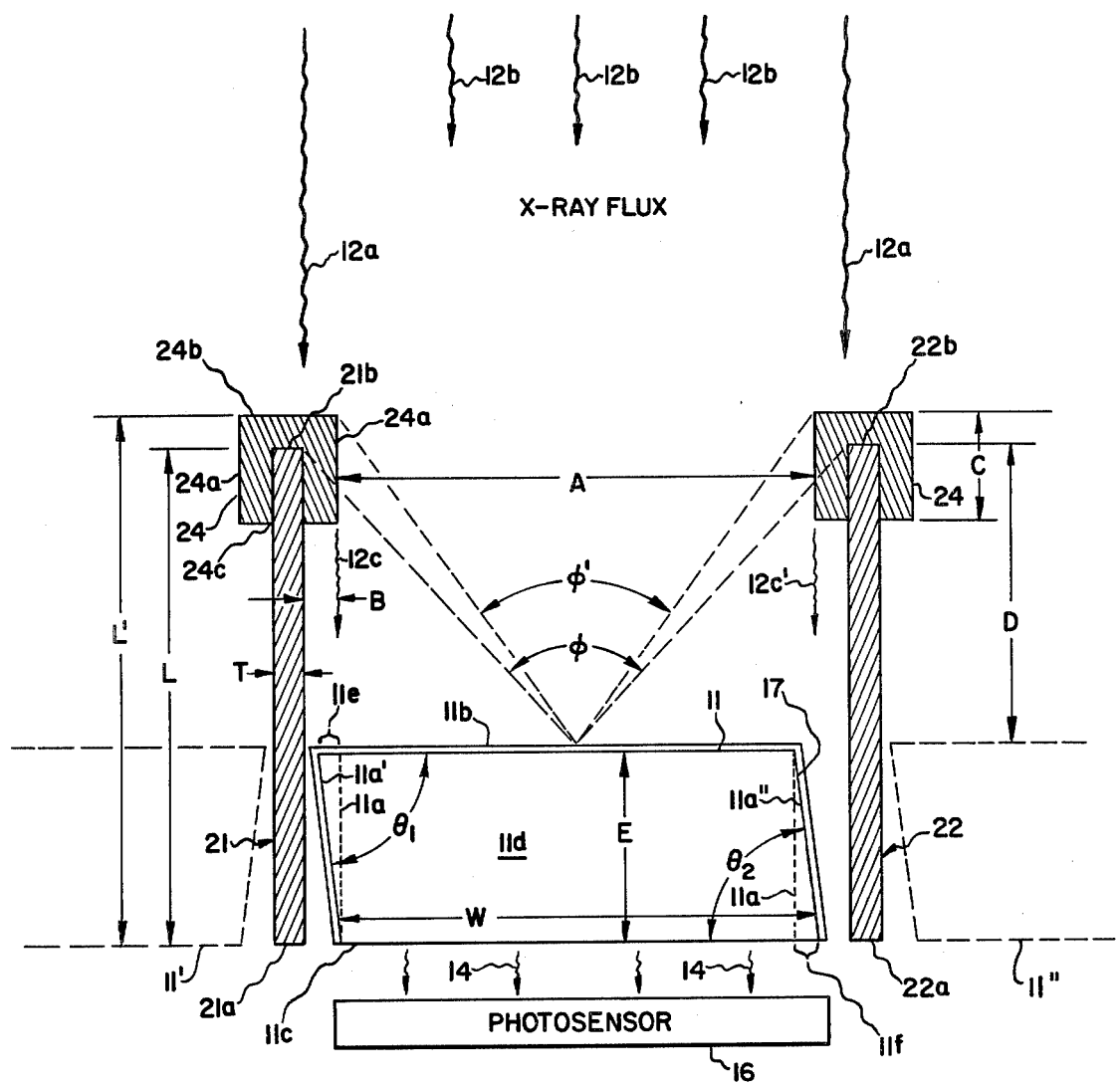

X-RAY DETECTOR

BACKGROUND OF THE INVENTION

The present invention relates to x-ray detectors and, more particularly, to a novel solid state x-ray detector having shaped collimator plates for substantially reducing the intensity of the x-ray flux falling on edges of a misaligned x-ray detector element.

Known x-radiation measurement apparatus, such as that utilized for computerized tomography and the like, requires measurement of x-ray flux with a high precision; generally x-ray flux measurement error of less than 0.1% is highly desirable. Many x-ray systems utilize more than one detector element; in particular, most computerized tomography systems require a multiplicity of detector elements which simultaneously receive and measure the x-ray flux. As poly-energetic x-ray sources are usually utilized to minimize the x-ray exposure time of the patient, each of the multiplicity of detector elements must respond to an x-ray signal of both widely varying intensity and variable x-ray spectrum and must so respond in a manner nearly identical to the response of all other detector elements in the detection system.

Many computerized tomography systems utilize an array of scintillating elements receiving the x-ray flux and converting the flux to quanta of photons at longer wavelength, typically in the ultraviolet and/or optical wavelengths; and a collimator, i.e. a means for limiting the angle over which the x-ray flux can enter the scintillator. In scintillating element detectors of the type having a rectangular parallelpiped scintillator bar, the detector response with respect to the incident x-ray energy depends upon the deviation of the scintillator from a perfect rectangular parallelpiped, and typically requires deviations of less than one part in a thousand. The detector response also depends, to some degree, upon the scattering of incident x-rays from any collimating means onto the scintillator element. It is desirable to have an x-ray detector wherein collimator scattering is reduced and the dependence upon deviation from a perfect rectangular parallelpiped shape of the scintillator element is decreased, to reduce manufacturing costs and increase mamufacturing yield.

BRIEF SUMMARY OF THE INVENTION

In accordance with the invention, a solid state x-ray detector utilizes a bar of a solid-state scintillating element and having a generally rectangular parallelpiped shape; a collimator plate of high atomic number material is arranged substantially parallel to each opposed end of the scintillator bar and extending therefrom toward the source of incident x-ray flux; photosensor means for detecting the x-ray induced fluorescence from the scintillator is arranged adjacent to at least one of the remaining scintillator surfaces for conversion of the ultraviolet, optical or infrared quanta from the scintillator to an electrical signal having a magnitude responsive to the magnitude of the incident x-ray flux; and the end of each collimator plate furthest from the scintillator element and closest to the x-ray source is thickened relative to the remainder of the collimator plate to cause the lateral surfaces of the scintillator bar to be shadowed by the thickened regions, thereby reducing the intensity of scattered radiation from the collimator plates and preventing x-rays from hitting edge regions of a misshapened or misaligned scintillator element, and also reducing variations of spectral response between detectors in a multi-detector array.

Accordingly, it is an object of the present invention to provide an x-ray detector utilizing shaped collimator plates to reduce x-ray flux measurement error.

This and other objects of the present invention will become apparent to those skilled in the art upon consideration of the following detailed description taken in conjunction with the drawing.

BRIEF DESCRIPTION OF THE DRAWING

The sole FIGURE is a sectional side view of a novel x-ray detector in accordance with the principles of the present invention.

DETAILED DESCRIPTION OF THE INVENTION

The sole FIGURE illustrates, albeit not to scale, a presently preferred embodiment of a novel x-ray detector 10, capable of measuring the magnitude of incident x-ray flux impingent thereon from an x-ray source (not shown for purposes of simplicity), which x-ray flux may be differentially partially absorbed by an object-to-be-examined (not shown) positioned between the x-ray source and detector 10.

Detector 10 comprises a member 11 formed of a solid-state material characterized by conversion of incident x-ray quanta 12 into fluorescence emission, i.e. emission of quanta 14 having wavelengths in the ultraviolet, visible and/or infrared regions. Preferably, scintillator element 11 is formed of a material such as thallium-doped cesium iodide (CsI:Tl), bismuth germanate ($Bi_4Ge_3O_{12}$) and the like. Ideally, the scintillator member should be essentially a perfect rectangular parallelpiped, having sides 11a (shown in broken line) perpendicular to the front surface 11b (upon which the x-ray flux impinges), rear surface 11c (fron which optical quanta 14 are emitted), and the pair of remaining side surfaces 11d. In practice, essentially perfect rectangular parallelpiped scintillating elements are rarely obtained; generally, the side surfaces 11a' and 11a", are lateral surfaces forming angles $\theta_1$ and $\theta_2$, respectively, to the front and rear faces 11b and 11c, respectively, of the scintillator member. Scintillator members, in prior art detectors, have been acceptable if no more than about one part in thousand deviation existed, e.g. $\theta \leq$ arctan $(001) \leq 0.06°$. This high degree of precision is necessary to prevent x-ray quanta from impinging upon the edge region 11e of the scintillator member, to be converted in somewhat variable manner into optical quanta due to the variations in size and shape of the volume beneath edge area 11e, with respect to the uniform cross-sectional area and volume below the remainder of incidence surface 11b.

A photosensor 16, which may be any means (such as a photodiode, phototransistor and the like) capable of detecting the x-ray induced fluorescence (optical quanta 14) emitted from scintillator member 11, is positioned adjacent to rear surface 11c of the scintillator element. It should be understood that photosensor 16 may also be positioned adjacent one of side surfaces 11d, if optical photons emerge from the scintillator member through the side surfaces, or adjacent to front surface 11b, if the photosensor is chosen to exhibit substantially no interception and convertion of x-ray quanta. It should also be understood that an optical-photon-reflective coating 17 may be "painted" upon those surfaces 11b, 11c and/or 11d not having a photosensor thereto adjacent; that more than one photosensor may be utilized; and that photosensors may be positioned adjacent to more than one of surfaces 11b, 11c and/or 11d.

One of a pair of collimating members 21 and 22 is disposed adjacent to each of scintillator element end surfaces 11a' and 11a''. Each collimating member is a substantially flat plate formed, to a thickness T, of a high atomic number material, such as tungsten, tantalum and the like, and arranged to be substantially parallel to the direction of incident x-ray flux. The elongated collimating members extend from a first end 21a, 22a situated generally at a plane formed by extending the rear surface 11c of the scintillator element forward for a distance L to a second end 21b, 22b, respectively, and thus extend a distance D forward of scintillator element front surface 11b toward the source of x-ray flux. It will be apparent that the greater the distance D to which the collimator members extend forward of scintillator element front surface 11b, the smaller the solid angle $\phi$ subtended by the detector aperture, i.e. the angle at which x-ray flux may arrive and impinge upon the scintillator member without striking one of the collimating members is reduced. However, x-ray quanta do impinge upon the collimator members and are scattered thereby to impinge upon the scintillator element and cause variations in the detected flux amplitude, with some resulting loss of magnitude and spatial resolution of the incident x-ray flux at the detector.

Each of collimating members 21 and 22 are provided with a thickened cross section at, and adjacent to, ends 21b and 22b, respectively. Advantageously, a U-shaped member 24, formed of the same material as utilized for collimator plates 21 and 22, is formed with a pair of substantially parallel, separated portions 24a extending in the same direction substantially perpendicular from a cross portion 24b, and having a slot 24c formed therebetween for closely receiving the associated second end 21b, 22b of a collimating member upon which the thickening member 24 is to be attached. It should be understood that each end member 24 may be attached to the associated collimating member by friction-fit or other means. The thickness B of each end member side portion 24a is selected to reduce the effective aperture distance A, between exterior side portion surfaces of adjacent collimator member end portions, to be less than the total width W of the scintillator member 11, whereby a shadowing effect is caused at the scintillator member edges, and particularly lateral edge surfaces 11a' and 11a''. Thus, thickness dimension B is selected to be equal to, or greater than, the largest acceptable length of edge area 11e, defined on the front surface 11b, or a similar edge area 11f defined upon the rear surface 11c, with each of edge areas 11e and 11f bounding a generally wedge shaped volume of scintillator material which is advantageously prevented from being illuminated by the x-ray flux, by means of end members 24. In this manner, x-ray quanta 12a incident upon the end members and collimating plates, is prevented from edge scattering onto the scintillator member, while the majority of incident x-ray quanta 12b will arrive through aperture A and impinge upon scintillator member 11. It will be appreciated that end members having a length C, in the direction towards the x-ray source, serve to further reduce the solid angle $\phi$, to angle $\phi'$, and hence have additonal collimating properties, in addition to preventing x-ray quanta and 12c' (the quanta furthest removed from the detector centerline midway between parallel collimator plates 21 and 22) from deleteriously impinging upon the scintillator element volumes defined by edge areas 11e and 11f.

In a typical detector 10, a scintillator element of thallium doped cesium iodide, and x-ray-transmissive layer 17, has a width W equal to about half the thickness E thereof (the drawing having exaggerated width); the adjacent collimator plates have a length L of about 12 times the detector element width, whereby the basic collimator plate extension D, beyond the scintillator front surface 11b, is about 10 times the width of the scintillator element. Each of collimating plates 21 and 22 is formed of a relatively thin (typically 6 milli-inches) sheet of tantalum. Each of end members 24, also formed of tantalum, has a length C of about 0.1 inches and a side portion thickness B sufficient to reduce the aperture distance A to about seven-eights of the distance between the facing interior surfaces of collimating plates 21 and 22.

It should be understood that an additional pair of collimating plates may be used adjacent to side surfaces 11d, i.e. perpendicular to the illustrated pair of collimating plates 21 and 22, and thus having their planes parallel to the plane of the drawing and above and below the drawing surface. Similarly, it should be understood that a plurality of scintillator members 11, and their associated photosensor means 16, may be arranged in end-to-end, or side-by-side relationship, as shown by additional scintillator elements 11' and 11'' (shown in phantom) to form a linear or two-dimensional detector array, with a collimator plate between each of the adjacent pair of scintillator members, e.g. collimator plate 21 between adjacent scintillator members 11 and 11'. In this configuration, a side portion 24a of each collimator plate end thickening member 24, "shadows" the edge regions of the lateral side surfaces of the associated one of the plurality of scintillator elements, to reduce both x-ray quanta scattering from the collimator plates and to reduce variations in the detected x-ray quanta due to quanta impingement upon the edge areas. It should also be understood that the plurality of scintillator members may be arranged such that their front surfaces form other than a flat plane, e.g. the front surfaces being tangent to a circular or hemispheric plane.

While the present invention has been described with reference to one preferred embodiment thereof, many variations and modifications will now become apparent to those skilled in the art. It is my intent, therefore, to be limited not by the scope of the particular embodiment disclosed herein, but only by the scope of the appending claims.

What is claimed is:

1. A detector for x-ray flux, comprising:
   scintillator means for converting quanta of x-rays indident thereon to optical fluorescence quanta and including a scintillator member having a generally rectangular parallelopiped shape with at least one lateral side surface;
   photosensor means adjacent the scintillator means for detecting the optical fluorescense quanta;
   a pair of plates each extending forward of, and substantially perpendicular to, a front surface of said scintillator member and generally toward the source of said x-ray flux for collimating the x-ray flux impingent upon said scintillator means; and
   means cooperating with said collimating means and positioned to shadow said lateral side surface of said scintillator member for substantially preventing impingement of x-ray quanta upon at least said lateral side surface of said scintillator member.

2. The detector as set forth in claim 1, wherein said preventing means includes a portion of each said plate furthest from said member having a thickness greater than the thickness of the remainder of each said plate.

3. The detector as set forth in claim 1, wherein said pair of plates of said collimating means are substantially parallel to each other; and said preventing means comprises a generally U-shaped end member having a channel therein for receiving the end of an associated plate furthest from said scintillator member, said end member having a thickness greater than the thickness of the associated plate.

4. The detector as set forth in claim 3, wherein each said U-shaped member is fastened to the associated plate in friction-fit manner.

5. The detector as set forth in claim 3, wherein said plates are formed of a material of high atomic number.

6. The detector as set forth in claim 5, wherein the plate material is selected from the group consisting of tungsten and tantalum.

7. The detector as set forth in claim 3, wherein said end member is formed of a material of high atomic number.

8. The detector as set forth in claim 7, wherein the end member material is selected from the group consisting of tungsten and tantalum.

9. The detector as set forth in claim 2, wherein said plates are formed of a material of high atomic number.

10. The detector as set forth in claim 9, wherein the plate material is selected from the group consisting of tungsten and tantalum.

11. The detector as set forth in claim 1, wherein the scintillator member is formed of a material selected from the group consisting of thallium-doped cesium iodide and bismuth germanate.

12. The detector as set forth in claim 1, wherein said photosensor means is at least one photodiode.

13. The detector as set forth in claim 1, wherein said photosensor means is at least one phototransistor.

14. The detector of claim 1, further comprising means surrounding a portion of said scintillator means for reflecting said optical fluorescence quanta generally towards said photosensor means.

15. The detector of claim 1, further, comprising:
a plurality of scintillator means for converting x-ray quanta incident thereon to optical fluorescence quanta, said plurality of scintillator means being arranged upon the surface of a multidimensional curve; and
photosensor means adjacent each of said plurality of scintillator means.

* * * * *